United States Patent Office 3,419,904
Patented Dec. 31, 1968

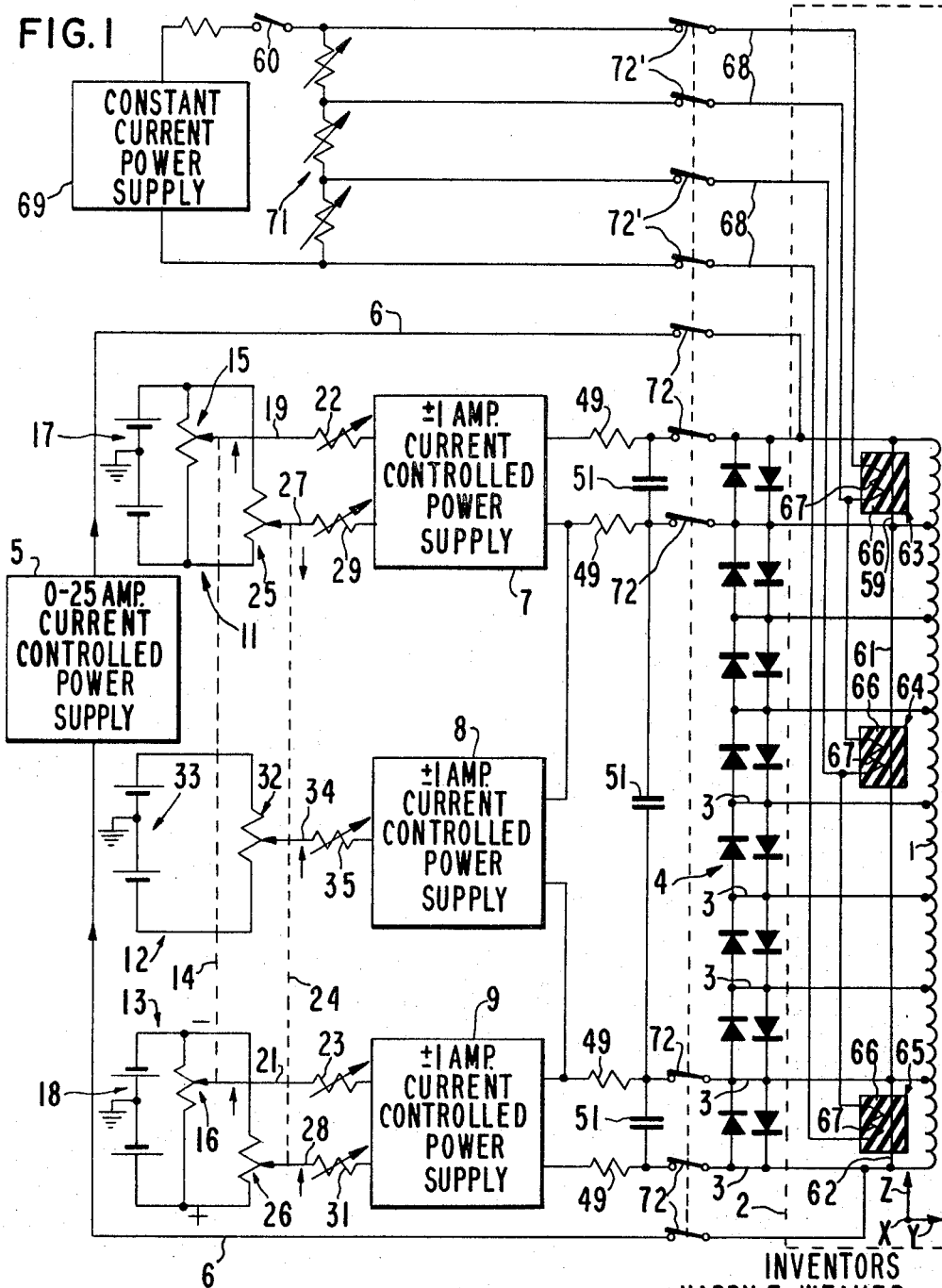

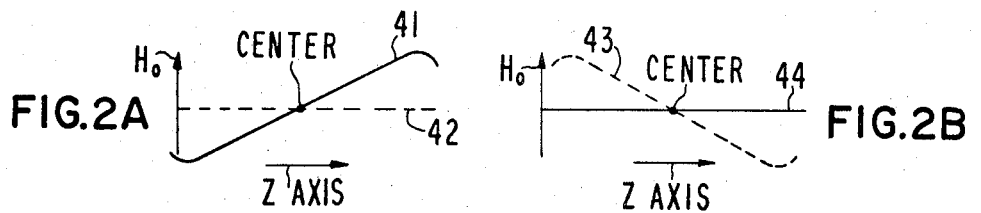
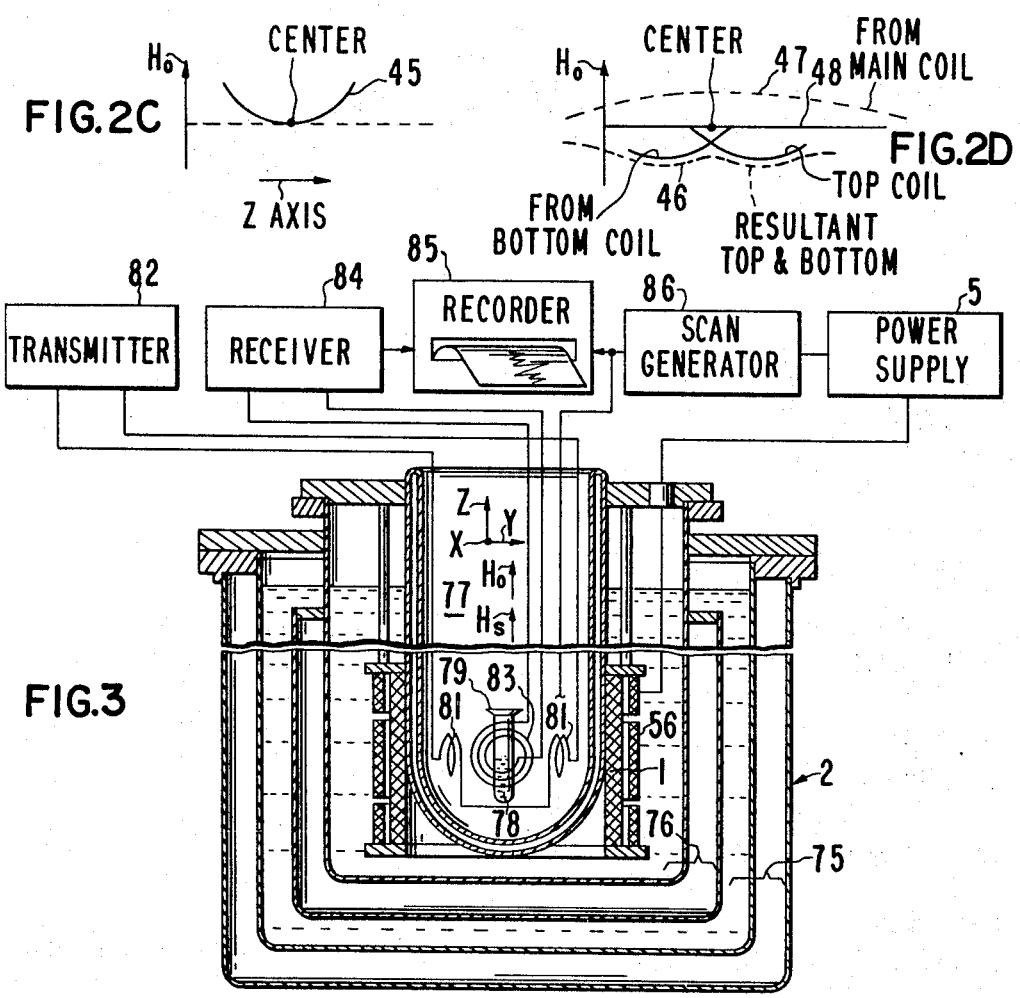

3,419,904
SUPERCONDUCTIVE SOLENOID HAVING WINDING SEGMENTS ADDITIONALLY ENERGIZED FOR GRADIENT CONTROL
Harry E. Weaver, Portola Valley, and Floyd E. F. Kingston, Palo Alto, Calif., assignors to Varian Associates, Palo Alto, Calif., a corporation of California
Filed May 5, 1966, Ser. No. 548,009
9 Claims. (Cl. 317—123)

ABSTRACT OF THE DISCLOSURE

A superconductive solenoid magnet is disclosed together with a gyromagnetic resonance spectrometer using same. The superconductive solenoid includes a plurality of separately energizable winding sections. Power supplies are provided for separately energizing the winding sections in sets with predetermined relative currents to produce corrective magnetic field gradient components within the magnetic field region of the solenoid to cancel certain residual magnetic field gradient components therein. The currents are arranged in the various sets of winding segments of the solenoid such that the total field intensity in the region being corrected is not changed by changes in the gradient cancelling components. The sample to be analyzed of a gyromagnetic resonance spectrometer is immersed in a corrected region of the magnetic field. The corrected solenoid magnet produces an extremely intense highly homogenous magnetic field permitting high resolution gyromagnetic resonance spectra to be obtained from the spectrometer.

Heretofore, superconductive magnet solenoids have been divided into plural sections of windings which had different currents in different sections for removing certain gradients. Such a solenoid forms the subject matter of and is claimed in copending U.S. application 483,402 filed on Aug. 30, 1965, and assigned to the same assignee as the present invention. In this prior system the main current supplied to the solenoid from its main power supply was variably shunted around one or more of the winding sections and added to one or more of the other winding sections to build up the field in one region and reduce the field in another region for removing axial gradients. While this arrangement will remove certain gradients it has the disadvantage that the gradient components produced by the available adjustments in the current by-passer were not pure gradient components. Instead they included a substantial fundamental field component such that the total field intensity changed in the center of the solenoid with each adjustment of the gradient controls. This is particularly troublesome for a magnet used with a gyromagnetic resonance spectrometer because the resonance signal is lost each time the total field intensity is changed.

In the present invention the main magnetic field producing solenoid is divided into plural sections of windings, as before, but these sections are simultaneously energized in groups with currents proportioned and directed through the various winding sections to produce pure field corrective gradient components without producing a fundamental field component at the center of the solenoid, whereby certain axial residual gradient components of the main magnetic field are cancelled without changing the total field intensity at the center of the solenoid.

The principal object of the present invention is the provision of an improved superconductive magnet.

One feature of the present invention is the provision of means for deriving a set of currents for simultaneously exciting plural winding sections of a superconductive solenoid to produce a field corrective gradient component without changing the total field intensity at the center of the solenoid.

Another feature of the present invention is the same as the preceding feature wherein the solenoid includes a pair of winding sections axially spaced apart along the solenoid straddling the center of the solenoid and wherein the pair of windings are energized by the gradient cancelling derived current components in magnetic field bucking relation to cancel a residual linear axial gradient component.

Another feature of the present invention is the same as the first feature wherein the solenoid includes three winding scetions, a pair of outer sections, and a center section, and wherein the outer windings are energized by the gradient cancelling derived current components in magnetic field aiding relation and wherein the center section is simultaneously energized by its gradient cancelling current component in magnetic field opposition to the outer winding sections, whereby a certain residual second order axial gradient component is cancelled.

Another feature of the present invention is the same as any one or more of the preceding features wherein the gradient cancelling currents are derived from plural power supplies connected to the various winding sections and having their output currents responsive to one or more controls which gang the plural power supplies together.

Other features and advantages of the present invention will become apparent upon a perusal of the following specification taken in connection with the accompanying drawings wherein:

FIG. 1 is a schematic circuit diagram, partly in block diagram form, of a superconductive magnet system employing features of the present invention, FIGS. 2a–d are plots of magnetic field intensity $H_o$ versus distance $d$ along the Z axis of the solenoid magnet of FIG. 1 and depicting the effect of the Z axis gradient cancelling coils of FIG. 1, and FIG. 3 is a schematic longitudinal sectional view, partly in block diagram form, of a gyromagnetic resonance spectrometer employing the magnet system of FIG. 1.

Referring now to FIG. 1 there is shown, in schematic form, a circuit diagram of a superconductive magnet system employing features of the present invention. A superconductive winding, which may comprise, for example, 120 thousand feet of copper jacketed NbZr wire is wound into a solenoid 1 12 inches long and 1.5″ in inside diameter. The solenoid 1 is preferably of the type having additional series connected windings at the ends to bring up the intensity of the field near the ends. The solenoid is tapped at a number of places along the length of the solenoid winding such as, for example, at 12,000 foot intervals of the winding. These taps are brought out of a cryostat 2, in which the solenoid 1 is immersed, via copper leads 3 to a bank of forward and backward conducting diodes 4, with one backward and one forward conducting diode connected across each tapped segment of the solenoid winding 1. The provision of these diodes 4 protects the solenoid 1 and power supply in case the solenoid quenches, and forms the subject matter of and is claimed in copending U.S. application 543,666, filed Apr. 19, 1966 and assigned to the same assignee as the present invention.

A main power supply 5, which is of the current controlled or regulated type, supplies the energizing current of 0–25 amps to the solenoid 1 via leads 6. Three additional power supplies 7, 8 and 9 which are of the current controlled type deliver ±1 amp of current with up to ±3 volts to allow $$L\frac{di}{dt}$$

voltage variations of their respective loads. The end power supplies 7 and 9 are each connected across the end winding segments or sections of the solenoid 1. Each end winding section comprises for example 10% of the total number of windings of the solenoid 1. The center power supply 8 is connected across the central section of winding segments which comprises about 80% of the total number of windings of the solenoid 1. The power supplies 7, 8, and 9 have a near infinite output impedance and each comprises an operational amplifier followed by a high fidelity type audio power amplifier stage with its capacitors removed to provide D.C. response. The output current of the power supplies 7, 8, and 9, as supplied to the two end and central winding sections, is controlled by the input signals applied to the power supplies 7, 8, and 9 from their respective potentiometer networks 11, 12 and 13.

The two end power supply inputs are ganged together via a shaft 14 driving the pick-off arms of a pair of potentiometers 15 and 16 which are connected across the terminals of grounded center tapped battery supplies 17 and 18. Turning the shaft 14 causes the respective pick-offs of the potentiometers 15 and 16 to provide equal and opposite input signals to the power supplies 7 and 9 via leads 19 and 21, respectively. In this manner plus current is supplied to one end segment of the solenoid and an equal minus current is supplied to the other end segment of the solenoid. These plus and minus currents are superimposed upon the main solenoid current supplied from the main power supply 5 to produce a linear gradient component superimposed upon the residual gradients of the main magnetic field of the solenoid 1 for cancelling a certain residual gradient in a manner more fully described below. Variable resistors 22 and 23 are placed in the leads 19 and 21 for providing a fine adjustment in the relative amplitudes of the output currents of the power supplies 7 and 9.

Similarly, a second common shaft 24 interconnects, and thus gangs, the potentiometer networks 11, 12 and 13 of the power supplies 7, 8, and 9 to provide another gradient control. In this instance the end segment power supply input potentiometers 25 and 26 are connected across their respective grounded centertapped batteries 17 and 18 such that turning the shaft 24 causes their respective pick-offs to pick off input signals of like sign, i.e., both plus or minus output current. These second input signals are supplied to end power supplies 7 and 9 via leads 27 and 28 with each lead including a variable resistor 29 and 31 for providing a fine relative adjustment in the amplitudes of the input signals. However, the center power supply 8 is also ganged to the shaft 24 and its input potentiometer 32 is connected across its grounded center tapped battery 33 in such a manner that its picked off input signal is of an opposite sign to that picked off by the end potentiometers 25 and 26. The center power supply input signal, picked off by potentiometer 32, is supplied to the center power supply 8 via lead 34 and variable resistor 35. Resistor 35 permits adjusting the amplitude of the input signal to the center power supply 8 relative to that supplied to the end power supplies 7 and 9.

The output current components, produced by rotation of shaft 24, are superimposed upon the currents in the solenoid 1 comprising those produced by the main power supply 5 and those currents produced by the end power supplies 7 and 9, as already determined by the preestablished setting of shaft 14. Thus, rotation of shaft 24 causes the end winding section current components to each vary alike in a like sense while the current component supplied to the center winding section varies in the opposite sense. The result is the production of an adjustable nonlinear axial gradient component which is superimposed upon the residual axial nonlinear gradient component of the main magnetic field, if any, for cancelling same to render the total magnetic field of the solenoid 1 more uniform.

The operation of the gradient cancelling controls 14 and 24 is more easily seen with regard to FIGS. 2a–d. Assume that the main magnetic field $H_o$, produced by the current from the main power supply 5 passing through the solenoid 1, is as shown by the solid line 41 of FIG. 2a. This field $H_o$ has a linear gradient along the axis of the solenoid 1, the Z axis. The desired field would be as shown by the dotted line 42 of FIG. 2a, i.e., a uniform field of constant intensity from one end of the solenoid 1 to the other. This linear gradient is cancelled in the circuit of FIG. 1 by turning shaft 14 to produce an increase in the field $H_o$ at the low intensity end and reduce the field $H_o$ at the high intensity end, as shown by the dotted line 43 of FIG. 2b.

In other words, the gradient cancelling current supplied to the end windings produces opposed magnetic field components in the region between the end sections. The resultant field is uniform as shown by the solid line 44 of FIG. 2b. Notice that this correction is made without changing the total magnetic field intensity at the center of the solenoid. This is very important because the field uniformity is typically monitored by, or used for, gyromagnetic resonance. If the total field intensity $H_o$ changed over the resonance sample, located at the center of the solenoid, the resonance signal would be lost, assuming the sample were excited from a conventional fixed frequency source tuned to the Larmor frequency in the field before the gradient correction was made.

Alternatively, assume the initial total magnetic field $H_o$ had a nonlinear gradient as shown by the solid line 45 in FIG. 2c. Turning the shaft 24 in the proper direction would introduce a corrective gradient component as shown by the dotted lines 46 and 47 of FIG. 2d. In this case, the end power supplies 7 and 9 supply currents to the top and bottom end winding sections in magnetic aiding relation. These top and bottom components are superimposed to produce a resultant component 46 which, if not otherwise compensated for, would produce a change in the total field intensity $H_o$ at the center of the solenoid. However, this change is avoided because the center power supply 8 produces an opposite sense current and field 47 which cancels, in the center region of the solenoid, the undesired field change produced by the end winding sections to produce a uniform total field 48 over the center region of the solenoid. In actual practice, the undesired residual main magnetic field gradients of the type depicted by lines 41 and 45 of FIGS. 2a and 2c are typically mixed. However, the controls 14 and 24 are independently adjustable, i.e., an optimum setting of one control 14 does not interfere with a previously optimized adjustment of the other control 24, for removing these undesired axial gradients, and the corrections are made without changing the total magnetic field intensity at the center of the solenoid 1.

Low pass filter networks comprising 0.5$\sim$ series connected resistors 49 and shunting capacitors 51 as of 2.2 $\mu$f. are connected across the output terminals of each of the power supplies 7, 8 and 9 to prevent oscillation of the output current of the power supplies 7, 8 and 9. Likewise, the main power supply 5 includes a low pass filter, not shown, connected across its output terminals for the same reason.

Although the end and center sections of the solenoid 1 are employed in connection with the separate power supplies 7, 8 and 9 for cancelling certain residual axial gradients, still other axial and transverse residual gradients exist which it is desirable to eliminate. Accordingly, several other gradient cancelling coils 56 (see FIG.

3) which preferably have certain prescribed physical geometries to permit optimum independent adjustment of each without mutual interference, are arranged adjacent the central region of the solenoid 1 for improving the uniformity of the field $H_o$. Such a set of coils form the subject matter of and is claimed in copending U.S. application 348,442, filed Mar. 2, 1964, now U.S. Patent No. 3,287,630 and assigned to the same assignee as the the present invention.

Once the main magnetic field has been corrected via the various gradient cancelling coils the magnet system may be switched into a persistent current mode thereby preserving indefinitely the total corrected field $H_o$. Superconductive wires 59, 61 and 62 are connected across the ends of the two end sections and the center section of the main solenoid windings. Persistent switches 63, 64 and 65 are connected in the superconductive wires 59, 61 and 62. The persistent switches each comprise a thermally nonconductive dielectric member 66 through which the superconductive wire 59, 61 and 62 passes. A resistive heating element 67 is also embedded in the dielectric member 66. Heating current is supplied to each of the heating elements 67 via leads 68 supplied with current from a power supply 69 as divided by and tapped off of a voltage divider network 71. An array of ganged single pole double throw switches 72 are connected in the leads 6 and 3 interconnecting the respective power supplies 5, 7, 8 and 9 and the solenoid 1, and in the leads 68 interconnecting the heating elements 67 of the persistent switches 63, 64 and 65.

Before the superconductive solenoid 1 is energized from the power supplies 5, 7, 8 and 9 the switches 72 and 72' are all closed. The heating elements 67 are thus energized thereby heating the superconductive wires 59, 61 and 62 slightly above their superconductive critical temperature such that they do not appear superconductive and thus do not bypass the current in the main superconductive solenoid winding 1. Once the proper field condition has been achieved in the main field of the solenoid magnet, as described above, the power supply 69 is switched off via a switch, not shown. The persistent switches 63, 64 and 65 are thus deenergized allowing the liquid helium within the cryostat 2 to quickly, i.e., in about 5 seconds, cool the superconducting bypass wires 59, 61 and 62 to their superconductive states. As the magnet current supplied from power supplies is reduced to zero the magnet current shifts from the circuit portions which include the various magnet power supplies 5, 7, 8 and 9 to the superconductive bypass circuit loop portions. In this manner the previously established currents in the various sections of the solenoid windings 1 persist indefinitely thereby preserving the preestablished corrected field conditions without the need of supplying additional power to the magnet system. Then switches 72 and 72' are open to isolate the magnet from the power supplies and transients they might generate due to power failures, etc., avoiding possible quenches. In the persistent mode, the field has enhanced stability since it is now isolated from the possible current fluctuations and surges produced by the power supplies. The provision of the superconductive gradient cancelling circuits forms the subject matter of and is claimed in copending U.S. application 549,353, filed May 11, 1966, and assigned to the same assignee as the present invention.

Referring now to FIG. 3 there is shown a gyromagnetic resonance system employing the magnet system of FIG. 1. The superconductive solenoid 1 is immersed in the cryostat 2. The second gradient cancelling coil system 56 is coaxially disposed of and outside the main solenoid 1. The cryostate 2 includes a liquid nitrogen dewar assembly 75 surrounding a liquid helium dewar assembly 76 which includes the superconductive solenoid 1 immersed therein. A third dewar 77 is centrally disposed of the liquid helium and nitrogen dewars and is open to the atmosphere. The third dewar 77 contains a gyromagnetic resonance sample 78 to be analyzed. The sample 78 is contained within a glass vial 79.

The solenoid 1 produces an intense uniform unidirectional magnetic field $H_o$, as of 52 kg. directed along the Z axis and through the sample volume. A transmitter coil 81, coaxially aligned with the X axis, is excited with radio frequency power supplied from a transmitter 82 at the Larmor frequency as of 220 mHz., for protons, of the gyromagnetic bodies within the sample 78 to excite gyromagnetic resonance thereof. A receiver coil 83, coaxially aligned with the Y axis, picks up the resonance signal emanating from the sample 78 and feeds the resonance signal to a receiver 84 wherein it is amplified, detected, and fed to a recorder 85.

The magnetic field $H_o$ is scanned in intensity by superimposing upon the main field $H_o$ a small scan field $H_s$ produced by a scan coil coaxial with the Z axis, not shown, and energized with a scan current signal supplied from a scan generator 86.

The field $H_o$ is thus scanned through the various resonance lines of the sample 78 to produce a resonance output spectrum signal. The spectrum signal is recorded in recorder 85 as a function of the scan field signal to produce the recorded resonance spectrum of the sample 78.

Since many changes can be made in the above construction and many apparently widely different embodiments of this invention could be made without departing from the scope thereof, it is intended that all matter contained in the above description or shown in the accompanying drawings shall be interpreted as illustraitve and not in a limiting sense.

What is claimed is:

1. A superconductive solenoid magnet apparatus including, means forming a superconductive solenoid winding having a multitude of turns of superconductor for producing when energized with current a main magnetic field region having certain axial residual magnetic field gradient components, means for dividing said winding of said solenoid means into a plurality of additionally energizable winding sections, means for additionally energizing certain of said windnig sections with predetermnied relative currents to produce a corrective magnetic field gradient component within the main magnetic field region to cancel a certain residual magnetic field component therein without changing the total field intensity in the region being corrected.

2. The apparatus of claim 1 wherein said additionally energizable winding sections include a pair of winding sections straddling the main magnetic field region to be corrected, and wherein said means for additionally energizing said pair of winding sections additionally energizes said pair of windings in magnetc field opposition whereby a residual linear axial field gradient is cancelled.

3. The apparatus of claim 1 wherein said additionally energizable winding sections include a pair of outer winding sections and a central winding section disposed therebetween, and wherein said means for additionally energizing said winding sections additionally energizes said outer pair of winding sections in magnetic field aiding relation and energizes said central winding section in magnetic field opposition to the outer pair of winding sections, whereby a certain non linear residual gradient component is cancelled.

4. The apparatus of claim 1 wherein said means for additionally energizing certain of said winding sections includes a plurality of power supplies feeding their outputs to certain ones of said winding sections.

5. The apparatus of claim 4 including ganged controls for simultaneously controlling the outputs of said plural supplies in a predetermined ratio of currents for generating the predetermined field corrective currents for additionally enegizing said certain winding sections.

6. The apparatus of claim 1 wherein said additionally energizable winding sections include a pair of outer winding sections at the ends of said solenoid and a central winding section inbetween said end sections, and wherein said means for additionally energizing said winding sections includes three power supplies with one power supply connected across each of said three winding sections, and means forming ganged controls for simultaneously controlling the outputs of plural ones of said supplies in a predetermined relationship of currents for generating the predetermined field corrective currents for additionally energizing said winding sections.

7. The apparatus of claim 6 wherein said ganged control means controls the outputs of said outer winding section power supplies to additionally energize said outer winding sections with current components to produce an opposing magnetic field component in the region of space between said pair of outer winding sections and along the axis of said solenoid, whereby a residual linear gradient along the axis of said solenoid is cancelled.

8. The apparatus of claim 7 wherein said ganged control means includes a second additional ganged control for controlling the outputs of said three power supplies to additionally energize said outer winding sections with current components to produce aiding magnetic field components on the axis of said solenoid in the region between said outer winding sections and to additionally energize said control winding section with a current component to produce a magnetic field component in magnetic field opposition to the aiding field components produced by said outer winding segments, whereby said second control cancels a certain non linear axial magnetic field gradient.

9. The apparatus of claim 6 including, means for immersing a gyromagnetic resonance sample within the magnetic field region of said solenoid, and means for exciting and detecting gyromagnetic resonance of the sample to produce a resonance output.

References Cited

UNITED STATES PATENTS

| | | | |
|---|---|---|---|
| 3,131,336 | 4/1964 | Hochwald et al. | 317—123 X |
| 3,183,410 | 5/1965 | Flora | 317—155.5 X |
| 3,308,349 | 3/1967 | Kirkpatrick | 317—123 |
| 3,333,162 | 7/1967 | Arbathnot | 317—155.5 |

LEE T. HIX, *Primary Examiner.*

U.S. Cl. X.R.

317—155.5; 324—.5; 335—216